June 15, 1965 H. F. TRAVIS 3,188,746
GEAR TESTING APPARATUS

Filed Sept. 25, 1962 3 Sheets-Sheet 1

INVENTOR.
HORACE F. TRAVIS
BY
ATTORNEY

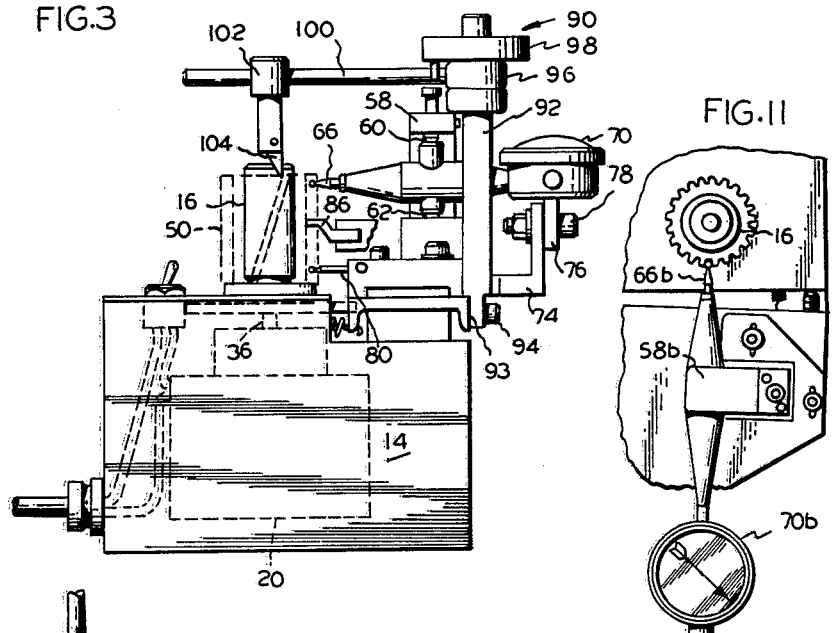
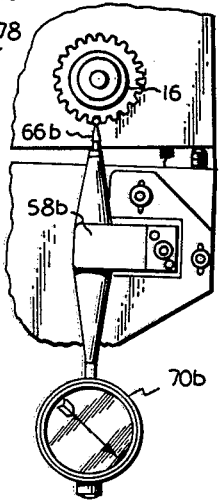
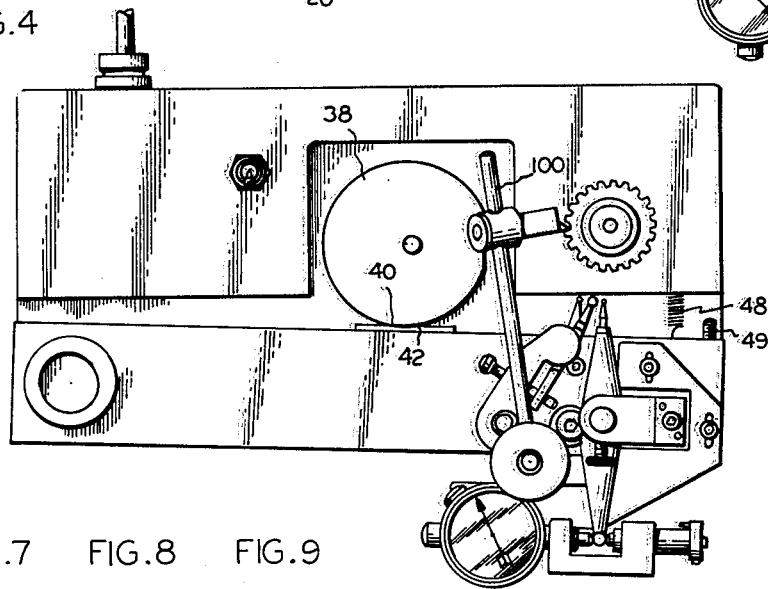
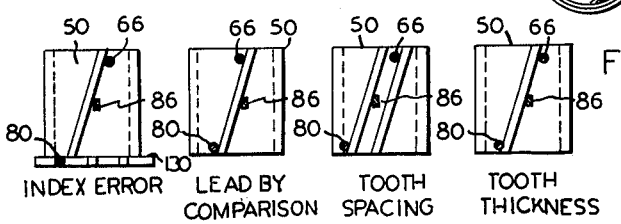

June 15, 1965      H. F. TRAVIS      3,188,746
GEAR TESTING APPARATUS
Filed Sept. 25, 1962      3 Sheets-Sheet 3
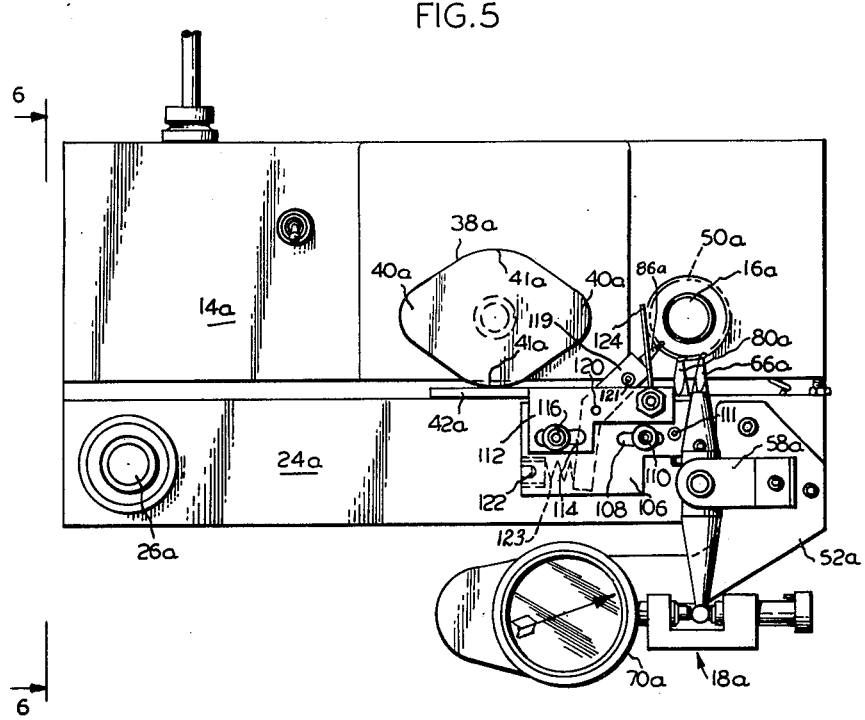
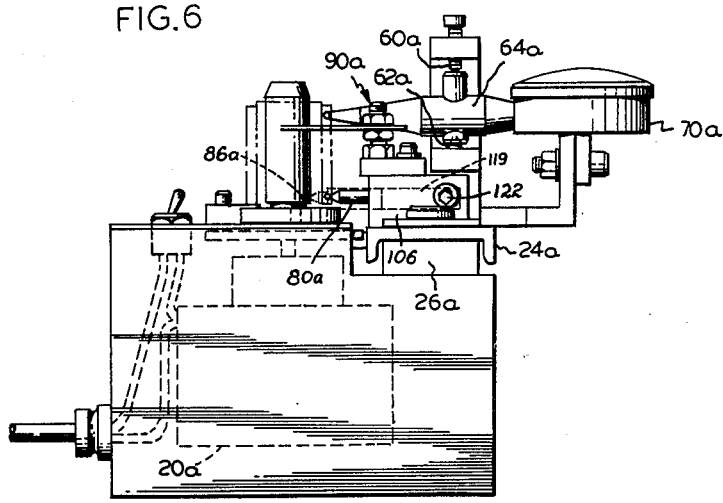
INVENTOR.
HORACE F. TRAVIS
BY
*Jack R. Halvorsen*
ATTORNEY

United States Patent Office 3,188,746
Patented June 15, 1965

3,188,746
GEAR TESTING APPARATUS
Horace F. Travis, Des Plaines, Ill., assignor to Illinois Tool Works Inc., Chicago, Ill., a corporation of Delaware
Filed Sept. 25, 1962, Ser. No. 226,003
2 Claims. (Cl. 33—179.5)

This invention relates to a novel apparatus for checking gears or similar workpieces. More particularly, it relates to a novel apparatus capable of checking the tooth spacing around the workpiece as well as checking the pitch diameter run out, the tooth thickness and lead and index error by comparison.

Apparatus has been heretofore proposed which would accomplish all of these functions wherein the means utilized to do the checking has been reciprocated in a linear fashion for moving into and out of contact with the workpiece. To insure accuracy in such devices, it has been necessary to build rugged, expensive equipment within close tolerances to accomplish these functions. Manually operated means have generally been used to move contacting members into and out of engagement with the workpiece. While such prior known machines have many valuable uses, the operation thereof is relatively slow and the equipment is large and cumbersome.

It therefore, is a primary object of the present invention to provide a compact, novel machine for checking the various functions indicated above relatively automatically and rapidly as well as economically.

Another object of the present invention is to provide a compact machine which can be utilized "on the line" and which will withstand rugged abuse by a multiplicity of operators, but which will maintain its accuracy within tolerances necessary to accomplish such testing.

More specifically, it is an object of the present invention to provide a machine which is relatively easy to convert so as to be able to check the multiplicity of gear functions enumerated above with a minimum amount of set up time.

Still another object of the invention is to provide a novel apparatus of the above described general type wherein means are provided for automatically indexing the workpiece during the testing operation.

Other objects and advantages of the present invention will become apparent from the following description and the accompanying drawings wherein:

FIG. 3 is an end elevational view of the apparatus when viewed along line 3—3 of FIG. 2;

FIG. 4 is a plan view similar to FIG. 2 but showing a secondary position of the apparatus during the testing cycle;

FIG. 5 is a plan view of another embodiment incorporating the principles of the present invention;

FIG. 6 is an end elevational view of the device shown in FIG. 5 taken along line 6—6 of FIG. 5;

FIG. 7 is a schematic view of one tooth of a gear like workpiece viewed in elevation when used in conjunction with an index plate to check lead error;

FIG. 8 is an elevational schematic of a single tooth of a gear like workpiece showing the positioning of the contact members when checking lead by comparison;

FIG. 9 is similar to FIG. 8 but shows the positioning of the contact members on two adjacent teeth of a gear like workpiece when checking tooth spacing;

FIG. 10 is similar to FIGS. 8 and 9 but shows the positioning of the contact members when checking tooth thickness of a gear like workpiece; and FIG. 11 is a partial plan view of a modification to the present invention for use in checking pitch diameter run out of a gear like workpiece.

Figure 1:
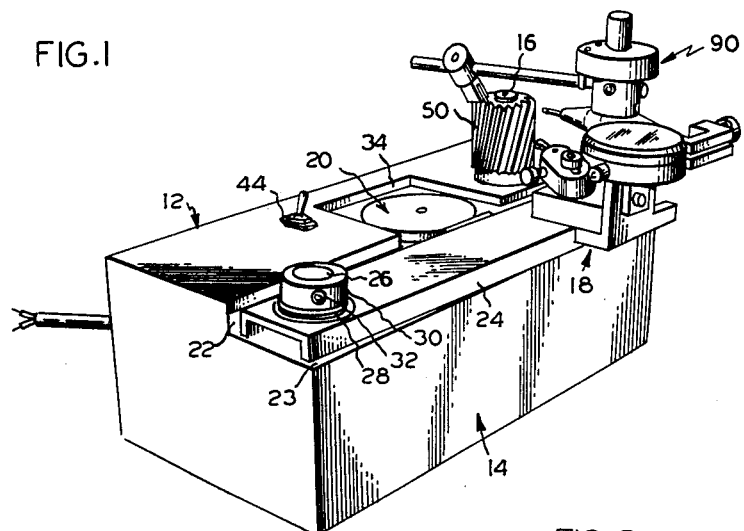
FIG. 1 is a perspective view of an apparatus embodying the principles of this invention.
Figure 2:
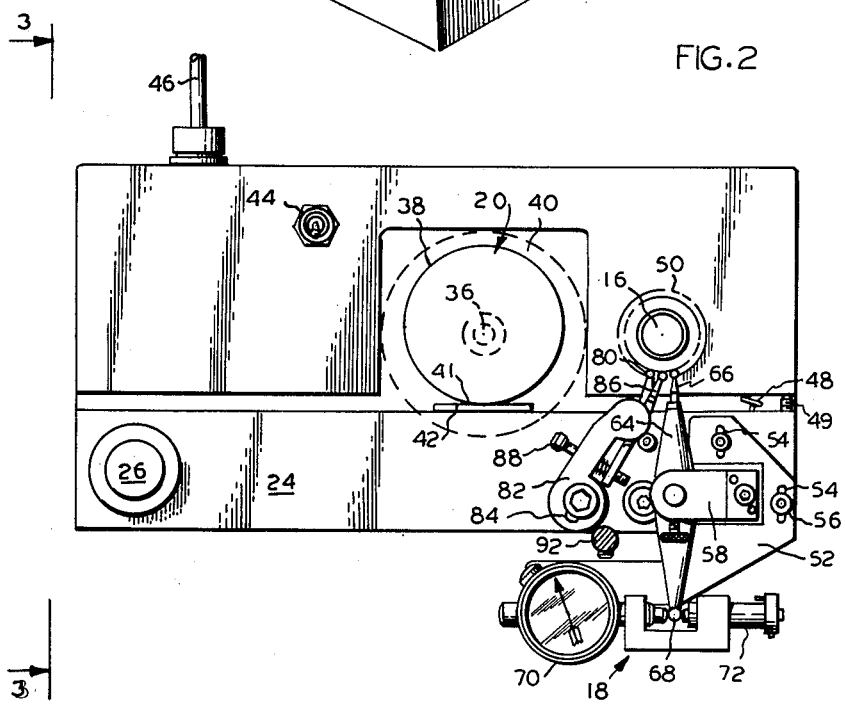
FIG. 2 is a plan view of the same apparatus.

Referring now more specifically to the drawings, wherein like parts are designated by the same numerals throughout the various figures, an apparatus or machine 12 embodying the principles of the present invention is seen in FIGS. 1-4. The machine 12 includes a base 14, a work supporting means or arbor 16, a pivotally mounted checking means generally designated 18 and a power system 20.

The base 14 is relieved along its front edge as at 22 so as to provide a longitudinal extending stepped shelf portion 23. The checking means 18 is mounted on an arm 24 complementally acceptable within the relief portion 22 of the base 14. Arm 24 is a substantially rigid member and may be channel shaped to insure its rigidity. It is mounted at one end on a pivot 26 which includes bearing means, not shown, and secured by washers 28 with a locking collar 30 suitably retained in position by a set screw 32. Other methods of retaining the arm 24 on its pivot will be apparent to those skilled in the art.

The base 14 is cut away on its upper surface as at 34 to provide means for accommodating the power system, which may be a gear motor, suitably reduced by multiple gearing, to provide a low output speed to a shaft 36. Mounted on shaft 36 is a cam member 38. In assembled relationship, the cam 38 which in the present instance has a single high lobe 40, engages a wear plate 42 secured to and positioned intermediate the ends of arm 24. A suitable switch means 44 positioned on the upper surface of the box is utilized to control the power source 46 to the power system 20. Rotation of the cam 38 results in a sequential repeating angular displacement of the arm 24 about its pivot 26 so as to produce an oscillatory movement of the arm about its pivot. Spring means 48 are provided at the end of the arm opposite to pivot 26 and interconnect the arm 24 with the base 14. Spring 48 is a tension spring and is adapted to normally maintain wear plate 42 in contact with the peripheral surface of cam 38. Adjustable stop means 49, such as a set screw, is provided on arm 24 at the extremity opposite to pivot 26. The stop means 49 is adapted to bear against the recess 22 of base 14 so as to accurately position checking means 18 when the arm 24 is spring returned after being manually moved outwardly for purposes of adjusting the checking means 18 or loading arbor 16.

Arbor 16 is mounted on the upper surface of the base 14 at a position remote from pivot 26 of the arm 24. It is generally a fixed cylindrical member adapted to accept a workpiece 50 having a hollow bore complementary in diameter to the arbor 16. Arbor 16 may be a solid shaft or may be provided with rotatable bearing means but, for accuracy purposes, is preferably a solid fixed member. Workpiece 50 in the present instance, is shown as a gear of the helical type commonly utilized as a pinion in automotive transmissions.

The checking means 18 is a comparative type checking element. It is provided with a fixed element, a movable element and means for recording the movement of the movable element relative to the fixed means. The checking means 18 is, of course, positioned generally in opposition to arbor 16 to cooperate with the workpiece 15 mounted thereon. An adjustable bracket 52 is mounted on the end of arm 24 opposite to pivot 26 and has a plurality of slots 54 through which set screws 56 engage the arm 24 in suitable tapped holes. This permits the adjustment of bracket 52 in a direction perpendicular to arm 24, or toward and away from arbor 16. Bracket 52 is provided with a yoke 58 having a pair of vertically disposed adjustable bearing members 60 and 62 which support movable detecting means 64 as in a gimbal. Movable means 64 has at its end adjacent to the arbor 16 a probe 66 which may be either of a point, ball or cylindrical configuration for suitable acceptance within the interdental spaces of the gear teeth of the workpiece 50. The opposite end of means 64 has a ball 68 which is positioned between the stem of gauge means 70 and an adjustable spring loading means 72 of a type well known in the art. Gauge 70 is adjustably mounted on a right angle bracket 74 by a slotted movable plate 76, secured to bracket 74 by screw means 78. The action of probe 66 moving on the pivot 60 and 62 will be further discussed hereinafter.

A fixed reference member 80 is adjustably mounted on arm 24 adjacent to but vertically spaced from probe 66. In the present instance, the fixed member is secured to a mounting member 82 having a slot 84 at one end to permit longitudinal as well as rotational positioning of fixed member 80 relative to the workpiece. Spaced above and operating in conjunction with fixed member 80 is an adjustable spring loaded member 86. When fixed member 80 engages a tooth surface, the spring loaded member 86 is utilized against an adjoining tooth surface to insure positive engagement of fixed member 80 with the reference tooth surface. The amount of spring pressure and location of member 86 is controlled by suitable means, such as set screw 88.

Indexing means 90 for rotation of the workpiece is provided adjacent to the checking means 18. (Means 90 is removed from FIG. 2 for clarity of illustration of other parts.) Indexing means 90 in the present instance, includes a vertically disposed rod element 92 fastened non-rotatably at its lower extremity on a flat recess 93 at one side of arm 24 by screw 94. At its upper extremity it is provided with a pair of adjustably fixed collars 96 and 98 which support a cantilever arm 100. Movably mounted along the axis of arm 100 is a ratchet type device 102. Ratchet device 102 has a spring loaded cam finger 104 for engaging the interdental tooth spaces of the gear workpiece during the checking operation.

In the operation of this device the power system is activated by switch 44 and rotation of the cam 38 commences. As the high lobe 40 approaches the wear plate 42, the arm 24 is swung outwardly, in the fashion shown in FIGURES 1 and 4, against the force of tension spring 48. This moves the ratchet finger 104 of the indexing means into engagement with a tooth space on the workpiece causing the workpiece 50 to revolve on the arbor 16. As the cam 38 continues to rotate and presents the low lobe 41, the arm 24 moves inwardly and checking means 18 is brought into engagement with the teeth of the workpiece. The fixed reference means 80 engages one surface of the workpiece with spring loaded means 86 insuring positive engagement of fixed reference means 80 with the selected reference surface on the workpiece teeth. Practically simultaneously the movable probe 66 is brought into engagement with a predetermined surface of the workpiece. The variation of the workpiece gear from an established norm set against a master is recorded on the gauge means 70 and can be visually read by the operator. While it generally may be desirable to measure a workpiece gear by comparison to a master, this need not occur in each instance. For example, in many instances the gear tooth thickness and tooth to tooth spacing relative to all the teeth on a gear is all that is desired. Hence, in these instances, a comparison to a master is not required. If desired, suitable recording means of types well known in the art can be electronically or mechanically attached to gauge 70 so as to provide a written record of the variations noted by probe 66.

Further rotation of the cam 38 results in the movement of the arm 24 away from the workpiece resulting in ratchet tooth 104 engaging a tooth of the workpiece and, further, rotation of workpiece 50 a predetermined amount on arbor 16. The cycle is repeated as many times as is desired by the operator so as to check each of the teeth on the workpiece or only selected numbers of teeth as might be desired. It should be noted, that preferably the low lobes of the cam do not ride on the wear plate but are undersized so that the stop means 49 can always bear against relief portion 22 when the arm 24 is in its most inward position. This insures the accurate positioning of checking means 18 relative to arbor 16 and its associated workpiece 50. This accuracy in positioning is then identical for each oscillation of arm 24 and eliminates the need for a highly accurate cam 38.

A second modification of the invention is seen in FIGURES 5 and 6 wherein similar parts will be designated by similar numerals with the addition of the suffix "a." The embodiment utilizes a base 14a having a power system 20a, a movable arm 24a oscillating about pivot 26a and an arbor 16a positioned on the base remote from and laterally spaced from pivot 26a.

The cam 38a in this embodiment has a double high lobe 40a and double low lobe 41a which sequentially bear against the wear plate 42a. This improves the speed with which the workpiece can be checked. The checking means 18a in the present device includes an adjustable bracket 52a having a yoke 58a mounting the movable means 64a between bearing points 60a and 62a as was shown in the original embodiment. In this embodiment, the fixed reference finger 80a is mounted on an adjustable bracket 106 having slot means 108 adapted to accept set screw 110 for moving the relatively fixed finger 80a along the axis of 24a relative to the movable probe 66a. Finger 80a is also adjustable along its own axis by means of set screw 111. A third finger or probe means 86a is provided in this embodiment to urge the workpiece 50a into positive engagement with the fixed reference member 80a. Finger 86a is retained in a bent lever 119 which is pivoted at its generally mid point 120 and mounted in bracket 106. Finger 86a is axially adjustable by means of set screw 121 to compensate for various sizes of workpieces. A compression spring 123 is located at the opposite end and acts against lever 119 and is adjustable by set screw 122. For the sake of clarity in the drawing, the lever arm 119 and fingers 86a are shown in phantom in FIG. 6. Thus, the urging of spring 123 through its pivoted lever causes finger 86a to urge the workpiece 50a in a clockwise direction into positive engagement with the fixed reference finger 80a. The adjustable brackets 106 and 112 are superimposed and mounted on arm 24a and hence, provide positive adjustable location of the fixed reference 80a, spring loaded finger 86a and indexing means 90a, relative to the workpiece.

In the previous instance, indexing means 90 operated to rotate the workpiece 50 as the arm 24 was moving outwardly away from the base 14a. In the present instance, indexing means 90a includes a simple cantilever spring 124 which rides on the outside peripheral surface of the workpiece 30a while the arm 24a is moving outwardly away from the base and then springs laterally into an interdental tooth space and causes rotation of the workpiece as the arm 24a and checking means 18a moves back toward the arbor 16a and its workpiece. The operation of this embodiment is essentially identical to the previous embodiment in that the fixed finger 80a acts as a positive reference point in engagement with a pre-selected specific tooth surface of the workpiece, fixed finger 80a being retained against the selected tooth surface by the spring urging of spring loaded finger 86a acting against a secondary tooth surface. Movable probe 66a will then record the deviation of a workpiece gear from the norm established against a master gear by actuation of the gauge 70a.

It should be noted, of course, that the norm expressed hereinabove relates to the relative positioning of fixed finger 80a and movable probe 66a when they engage a master or reference workpiece. Subsequent workpieces are then checked relative to the norm established by the master.

To indicate the various gear functions which can be checked with these devices, a single or two tooth schematic showing is made in FIGURES 7–11. In FIGURE 7 a showing is made of the way index error can be checked. A master plate 130 is keyed to the gear workpiece and is engaged by fixed probe 80. Movable means 86 engages one side of the work tooth surface urging fixed member 80 into positive engagement with the index plate 130. Movable probe 66 engages a selected side of the tooth and measures comparatively any index error.

FIGURE 8 displays the checking of the lead of the helix angle by comparing the workpiece tooth to a norm established by a master. Fixed finger 80 engages one side of the tooth while spring loaded finger 86 engages the opposite side of the tooth to insure positive location. Movable probe 66 engages the same side of the gear tooth as is engaged by fixed finger 80 but at an axially spaced point. The angle formed by a line drawn between 80 and 66 when taken in combination with the axis of the arbor produces the lead of the helical tooth. This, of course, is a measurement of lead by comparison with a master and not a positive measurement.

FIGURE 9 shows the relationship of the three probes or fingers relative to a pair of adjoining teeth to measure tooth spacing by the comparison method. Similarly, FIGURE 10 is a check of tooth thickness by comparison.

FIGURE 11 represents a modification of the present invention in the checking means and schematically displays a checking means which provides a direct reading of pitch diameter run out. The yoke 58b supports, in a fixed relationship, an axially movable probe 66b. Probe 66b is incapable of angular movement of the type accomplished by its counterparts 66 and 66a. Probe 66b is spring loaded along its axis and moved in a direction substantially radially of the arbor 16 with its motion transmitted back directly into gauge 70b. By comparison, with a master gear, the pitch diameter run out of a particular workpiece gear can be quickly ascertained by variances recorded on gauge 70b.

Thus, applicant has disclosed a compact device capable of quickly and efficiently recording, by comparative methods, five functions of gear tooth design. The device provides an accurate measurement, is rugged in structure and is relatively economical to fabricate because of the general simplicity of its components as well as the elimination of expensive bearing surfaces commonly found in checking instruments capable of checking similar functions. While more than one embodiment has been disclosed for purposes of illustrating the invention, it is felt that other embodiments will become apparent to those skilled in the art and hence, it is my desire that I be limited only by the scope of the appended claims.

I claim:

1. An apparatus for testing gears or the like comprising a base, an arbor mounted on said base adapted to accept a workpiece gear having circumferentially spaced teeth, a shaft mounted on said base with said shaft having its axis parallel to the axis of said arbor but spaced therefrom, an arm pivotally mounted on said shaft adjacent one end of said arm, rotatable cam means mounted on said base, said cam means being positioned to engage said arm intermediate its ends, means acting on said arm at a point remote from said pivot shaft and adapted to normally maintain said arm in contact with said cam means, said cam means having one or more lobes which upon rotation is adapted in cooperation with said last mentioned means to move the end of said arm remote from said pivot towards and away from said arbor means in an oscillating movement about said pivot shaft, checking means mounted on said arm adjacent the end remote from said pivot shaft, said checking means including three contact members extending toward said arbor and each contact member being independently adjustable to engage interdental spaces of a workpiece gear mounted on said arbor, the first contact member being an adjustable rigid element normally fixed relative to said arm to serve as a reference point, the second contact member being spaced from said first contact member a distance at least equal to one interdental tooth spacing of the workpiece gear, said second contact member being spring loaded to aggressively urge a tooth of the workpiece gear into engagement with said reference point first contact member, said third contact member being laterally movable and mounted in spaced relation to said first contact member a distance related to surfaces to be contacted, indicating means mounted on said arm and connected to said third contact member for indicating the measurement of movement of said member, index means mounted on said arm and extending towards said arbor and having means for engaging successive wall portions defining the interdental spaces on the periphery of the workpiece gear as said arm moves toward and away from said arbor thereby indexing said gear workpiece about said arbor with each movement of said arm and measurement of the gear workpiece, said checking means and at least two of the three contact members having means to permit individual adjustment relative to said arm and relative to a master reference gear mounted on said arbor whereby deviations of workpiece gears mounted on said arbor can be indicated relative to said master gear.

2. An apparatus for testing gears or the like comprising a base, an arbor mounted on said base adapted to accept a gear like workpiece having a plurality of generally radially extending circumferentially spaced surfaces, an arm pivotally mounted adjacent one end on said base, a first contact member adjustably fixed on said arm in spaced relation to its pivot and extending generally towards said arbor for engaging one of said surfaces in a relatively fixed manner to act as a reference point, a second contact member movable relative to said first contact member mounted on said arm in spaced relation to its pivot and extending generally towards said arbor and adapted for movably engaging one of said surfaces, measuring means for indicating the relative movement of said second contact member as compared with said first contact member, means mounted on said base for engaging said arm and adapted to move said arm at its end opposite its pivot towards and away from said arbor by oscillation about its pivot, means mounted on said arm for indexing the workpiece during each oscillation of the arm whereby said contact members also mounted on said arm are moved into and out of engagement with successive surfaces of a workpiece mounted on said arbor for testing the workpiece and indicating the results of said test on said measuring means, said indexing means includes a cantilever spring mounted on said arm and adapted to engage and slip over the periphery of a workpiece mounted on said arbor during the movement of said arm away from the arbor, the end of the spring being adapted to move laterally and engage one of said surfaces during the movement of said arm toward said arbor whereby a workpiece mounted on the arbor is incrementally rotated during each oscillation of said arm so that said contact members will engage different surfaces of the workpiece mounted on the arbor during each oscillation of said arm.

References Cited by the Examiner
UNITED STATES PATENTS

| | | | |
|---|---|---|---|
| 1,651,159 | 11/27 | Schurr | 33—179.5 |
| 2,802,277 | 8/57 | Jaeger | 33—179.5 |
| 2,913,831 | 11/59 | Hofler | 33—179.5 |
| 3,069,779 | 12/62 | Bauer | 33—179.5 |

LOUIS R. PRINCE, *Primary Examiner.*

LEONARD FORMAN, *Examiner.*